United States Patent [19]
Kerr

[11] 4,063,741
[45] Dec. 20, 1977

[54] FLUID FACE SEAL ASSEMBLIES
[75] Inventor: William Kerr, Nelson, England
[73] Assignee: J. H. Fenner & Co. Limited, North Humberside, England
[21] Appl. No.: 622,515
[22] Filed: Oct. 15, 1975
[30] Foreign Application Priority Data
Oct. 17, 1974 United Kingdom ............... 44983/74
[51] Int. Cl.² ............................................... F16J 15/36
[52] U.S. Cl. ...................................... 277/37; 277/40; 277/88; 277/90
[58] Field of Search ............... 277/40, 88, 37, 212 FB, 277/38, 90, 35
[56] References Cited
U.S. PATENT DOCUMENTS

| | | | |
|---|---|---|---|
| 2,601,996 | 7/1952 | Sefren | 277/88 |
| 2,824,760 | 2/1958 | Gits | 277/40 |
| 2,984,505 | 5/1961 | Andresen et al. | 277/88 |
| 3,026,114 | 3/1962 | Andresen et al. | 277/88 |
| 3,356,376 | 12/1967 | Bradfute et al. | 277/37 |

Primary Examiner—Richard E. Aegerter
Assistant Examiner—L. Footland
Attorney, Agent, or Firm—Diller, Brown, Ramik & Wight

[57] ABSTRACT

In a fluid face seal assembly comprising an elastomeric annular seal for engaging in a recess of a stationary housing or the like component, an axially directed extension on a radially inner limb of the annular seal, an annular face seal carried by said extension and spring means acting between said face seal and said annular seal to maintain a resilient relationship between the two, the invention provides a step constituting a carrier member at the free end of the extension and a thickened free end on the step which retains the face seal in abutment against the shoulder between the step and the remainder of the extension, and a retainer acting to compress the thickened end of the step between itself and a radially adjacent part of the face seal thereby mechanically to lock said face seal onto said carrier member.

10 Claims, 3 Drawing Figures

FLUID FACE SEAL ASSEMBLIES

This invention relates to rotary mechanical seals and more particularly to so-called face seals or sliding ring seals of the type which are used to isolate contiguous fluid compartments at a position at which a rotary shaft passes through a wall common to said compartments.

The essential components of a face seal assembly are an annular seal for engaging a stationary part such as a pump or the like housing and the face seal itself, constituting a closure member resiliently urged against an annular flange or hub or similar element on the shaft to be sealed. Usually, the resilient sealing force is exerted by a spring which acts upon the face seal to urge said face seal into intimate rubbing contact with a mating counterface surface.

A typical fluid face seal assembly of the prior art is described in British patent specification No. 1,206,393 wherein the closure member is formed with a skirt which extends axially into the bore of the annular seal where it is constrained against rotational movement by means of axially directed grooves which engage with protrusions in the bore of the annular seal, said annular seal incorporating a stiff ringshaped reinforcement.

To give satisfactory service life, it is essential that the rubbing surfaces of such seals be formed from a hard wear resistant material capable of providing a smooth surface finish. Suitable materials include steel, carbon and ceramic and these are well-known in certain constructions of face seals. However, softer and readily mouldable materials such as phenolic resins provide a useful and economic means of achieving the intricate shapes as required for face seals of the type described and are often resorted to in the place of the more difficult steels, carbons and ceramics.

A disadvantage of many known seal assemblies is that their design necessitates that the face seal and annular seal be secured together by adhesive. The scrap rate associated with glued constructions can be quite high and glued joints may deteriorate over prolonged use and give rise to leaks.

The invention seeks to provide a face seal assembly of the type described wherein the annular seal and face seal are assembled together in a non-bonded or non-adhesively connected relationship.

According to the present invention a fluid face seal assembly comprises an elastomeric annular seal for engaging in a recess of a stationary housing or the like component, said annular seal having radially inner and outer, axially directed limbs which at one end are joined by a radially directed end wall, the said limbs and said end wall co-operating to define an annular recess in said seal, a stiff ring-shaped element seated in said recess and having radially and axially directed portions bearing against corresponding regions of said annular seal to reinforce said seal, an axially directed extension on the radially inner limb of said annular seal, a step constituting a carrier member at the end of said extension remote from said limb, said step having a thickened free end, an annular face seal seated on said carrier member and retained by said thickened end in abutment against the shoulder between said step and the remainder of said extnsion, a retainer supporting at least said step and the adjoining part of said extension, said retainer acting to compress said thickened end between itself and a radially adjacent part of said face seal thereby mechanically to lock said face seal onto said carrier member, means for preventing relative rotation between said face seal and said annular seal, and spring means acting between said face seal and said annular seal to maintain a resilient relationship between the two.

The fact that the thickened end of the elastomeric seal extension is clamped between the face seal and the retainer avoids the possibility of loss of integrity of the connections between the elastomeric extension and the face seal such as may occur if the retainer were omitted and reliance were placed solely upon the elastomeric property of the thickened end of the extension. The retainer therefore renders the connection between the face seal and elastomeric extension independent of such compression set and stress relaxation effects as may be expected from the elastomeric material employed.

The invention will be described further by way of example, with reference to the accompanying drawings, which are as follows.

Figure 1:
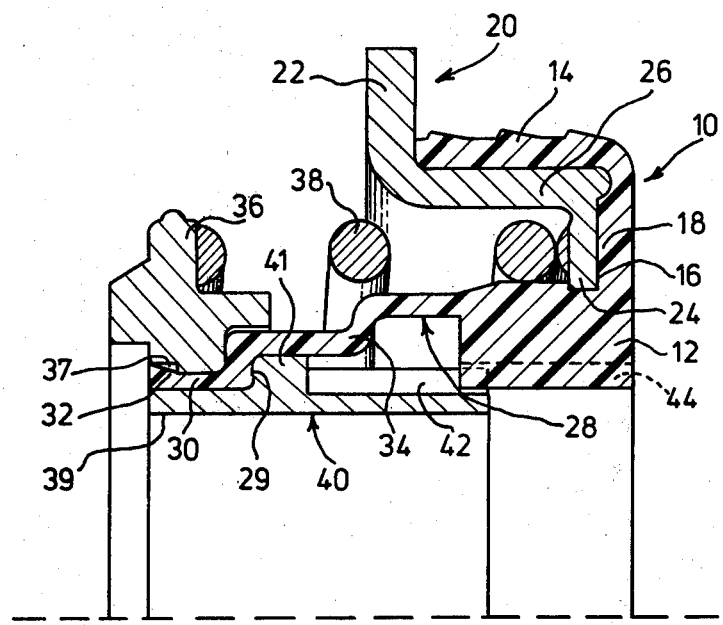
FIG. 1 is a half-axial sectional view through one form of face seal assembly.

The face seal assembly shown in FIG. 1 of the drawings comprises an annular seal generally designated 10 which includes a radially inner limb 12 and a radially outer limb 14 having an annular recess 16 defined between them. The radially inner and outer limbs 12 and 14 are joined together by an end wall 18. The annular seal 10 is intended to engage in an appropriately dimensioned recess in a housing or the like component and in order to stabilize and reinforce the annular seal for this purpose there is seated within the recess 16, a reinforcing insert 20 which is preferably made of a thermoplastics material and which comprises axially spaced radially directed limbs 22 and 24 joined by an axially directed limb 26.

To the radial inner limb 12 of the annular seal 10 there is integrally joined an axially directed extension 28 which terminates in a reduced diameter step constituting a carrier 30 formed with an outwardly diverging, frusto-conical or otherwise thickened free end 32. At a point along its length, the extension 28 is formed with a fold or bend 34.

The carrier member 30 serves to receive a face seal component 36 between which and the limb 24 of the reinforcing insert 20 there acts a compression spring 38 serving to urge the face seal member away from the annular seal 10. The face seal component 36 is, of course, retained by virtue of the thickened end 32 of the carrier member 30 against the shoulder 29 situated between said member 30 and the remainder of the extension.

Within the annular seal 10 and its extension 28 there is located a generally cylindrical, stiff sleeve or retainer 40 which serves to support the extension 28 and carrier member 30 and which also has a formed, ring-shaped portion 39 acting to deform and compress the thickened end 32 of the carrier member 30 between said sleeve and the face seal 36, thereby mechanically locking the face onto the carrier member 30. As shown the face seal 36 may be formed with a rebate 37 for receiving the displaced carrier member portion 32.

By virtue of the construction provided by the invention since the thickened free end 32 of the carrier member 30 acts together with the sleeve 40 to retain the face seal component 36 on the carrier member and since the spring 38 acts between the face seal 36 and annular seal 10, all these components, including the thermoplastics insert 20 are retained together as a single assembly which is easily handled for transportation and subsequent installation in a position of use.

It will be noted that adjoining the forward ring portion 39, the sleeve or retainer 40 has an intermediate portion 41 of enlarged diameter which provides a shoulder abutting against the junction 29 between the carrier member 30 and the remainder of the extension 28 to retain the sleeve in one direction within the extension 28 and to support the carrier member 30. Interacting rib and groove means 42 and 44 formed respectively on the sleeve 40 and the inner limb 12 of the annular seal 10 serve to prevent relative rotation between the sleeve and the remainder of the assembly and to stabilise axial movements of the face seal.

Figure 2:
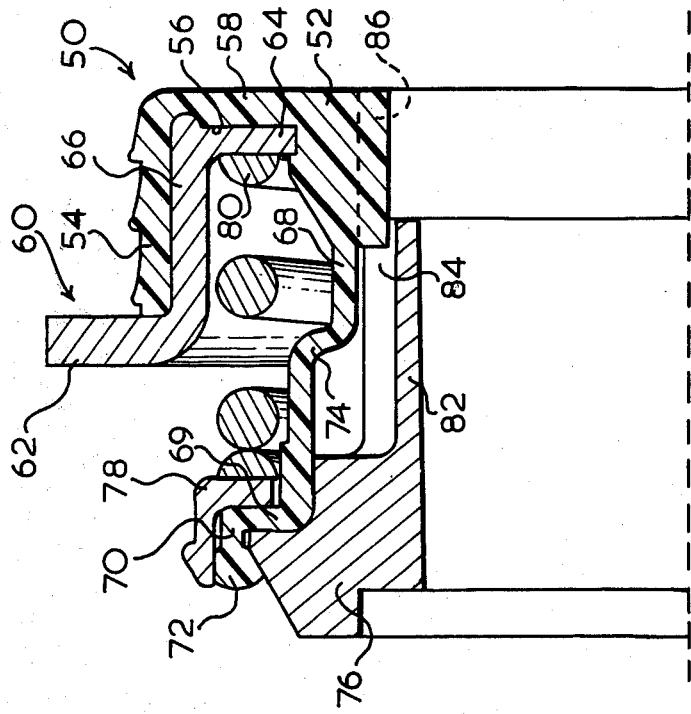

The face seal assembly shown in FIG. 2 comprises an annular seal generally designated 50 which includes a radially inner limb 52 and a radially outer limb 54 having an annular recess 56 defined between them. The radially inner and outer limbs 52 and 54 are joined together by an end wall 58. The annular seal 50 is intended to engage in an appropriately dimensioned recess in a housing or the like component and in order to stabilize and reinforce the annular seal for this purpose there is seated within the recess 56 a reinforcing insert 60 which is preferably made of a thermoplastics material and which comprises axially spaced radially directd limbs 62 and 64 joined by an axially directed limb 66. The insert 60 may alternatively be formed of, for example metal and may or may not be bonded to or moulded into the annular seal 50.

To the radial inner limb 52 of the annular seal 50 there is integrally joined an axially directed extension 68 which terminates in an increased diameter step constituting a carrier 70 formed with a diverging free end 72. At a point along its length, the extension 68 is formed with a fold or bend 74.

The carrier member 70 serves to receive a face seal component 76 seated on a shoulder 69 between the carrier 70 and the remainder of the extension 68. A retainer in the form of a flanged ring 78 engages the other side of the shoulder 69 and passes over the carrier member 70 to displace the diverging free end 72 inwardly against the face seal 76 and thereby retain the face seal against the shoulder 69. A compression spring 80 is positioned between the retainer 78 and the insert 60 and serves to urge the face seal away from the annular seal 50.

The face seal component 76 has an axial extension 82 which co-operates with the inner limb 52 of the annular seal 50 by way of interacting rib and groove means 84 and 86 to prevent relative rotation between the face seal component 76 and the annular seal 50.

Figure 3:
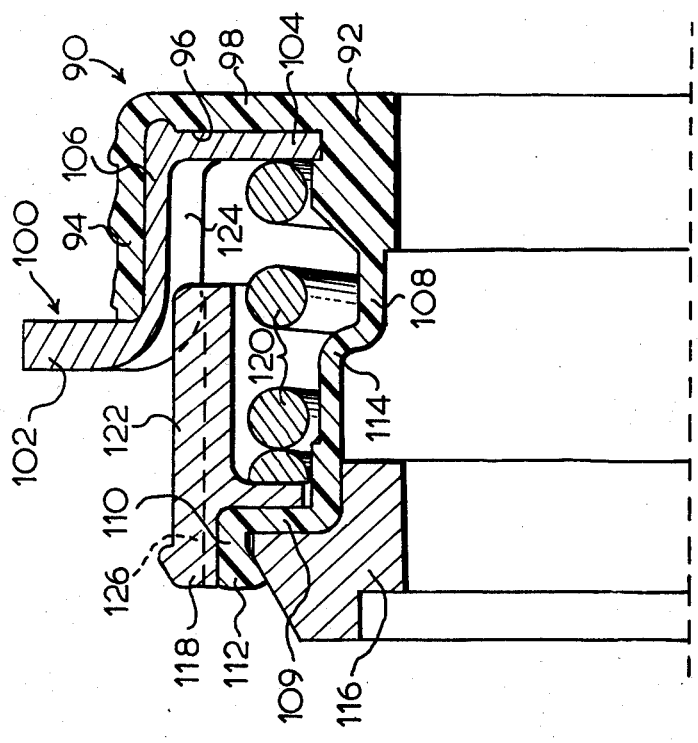
FIGS. 2 and 3 are views similar to FIG. 1 of modified face seal assemblies.

The face seal assembly shown in FIG. 3 comprises an annular seal generally designated 90 which includes a radially inner limb 92 and a radially outer limb 94 having an annular recess 96 defined between them. The radially inner and outer limbs 92 and 94 are joined together by an end wall 98. The annular seal 90 is intended to engage in an appropriately dimensioned recess in a housing or the like component and in order to stabilize and reinforce the annular seal for this purpose there is seated within the recess 96, a reinforcing insert 100 which is preferably made of a thermoplastics material and which comprises axially spaced radially directed limbs 102 and 104 joined by an axially directed limb 106. The insert 100 may alternatively be formed of, for example, metal and may or may not be bonded to or moulded into the annular seal 50.

To the radial inner limb 92 of the annular seal 90 there is integrally joined an axially directed extension 108 which terminates in an increased diameter step constituting a carrier 110 formed with a diverging free end 112. At a point along its length, the extension 108 is formed with a fold or bend 114.

The carrier member 110 serves to receive a face seal component 116 seated on a shoulder 109 between the carrier 110 and the remainder of the extension 108. A retainer in the form of a flanged ring 118 engages the other side of the shoulder 109 and passes over the carrier member 110 to displace the diverging free end 112 inwardly against the face seal 116 and thereby retain the face seal against the shoulder 109. A compression spring 120 is positioned between the retainer 118 and the insert 100 and serves to urge the face seal away from the annular seal 90.

The ring 118 has an axial extension 122 which co-operates with the insert 100 by way of interacting rib and groove means 124 and 126 to prevent relative rotation between the ring 118 and the insert 100.

For the reasons given with reference to FIG. 1, all of the components of the seal assemblies shown in FIGS. 2 and 3, including the thermoplastics reinforcing or stiffening inserts are retained together as a single assembly which is easily handled for transportation and subsequent installation in a position of use.

I claim:

1. A fluid face seal assembly comprising an elastomeric annular seal for engaging in a recess of a stationary housing or the like component, said annular seal having radially inner and outer axially directed limbs which at one end are joined by a radially directed end wall, the said limbs and said end wall co-operating to define an annular recess in said seal, a stiff ring-shaped element seated in said recess and having radially and axially directed portions bearing against corresponding regions of said annular seal to reinforce said seal, an axially directed extension on the radially inner limb of said annular seal, a step constituting a carrier member at the end of said extension remote from said limb, said step having a thickend free end, an annular face seal directly engaging said carrier member and retained by said thickened end in abutment against the shoulder between said step and the remainder of said extension, a retainer supporting at least said step and the adjoining part of said extension, said retainer acting to compress said thickened end between itself and a radially adjacent part of said face seal thereby mechanically to lock said face seal onto said carrier member, means for preventing relative rotation between said face seal and said annular seal, and spring means acting between said face seal and said annular seal to maintain a resilient relationship between the two.

2. A fluid face seal assembly as set forth in claim 1 wherein said step is a reduced diameter step and the face seal is seated on said step.

3. A fluid face seal assembly as set forth in claim 1, wherein said step is an increased diameter step engaged around the face seal.

4. A fluid face seal assembly as set forth in claim 1, wherein the step is flared toward said face seal in a direction towards its free end.

5. A fluid face seal assembly as set forth in claim 1, wherein the retainer is a ring means arranged concentrically with and radially adjacent a cooperating region of the face seal and having at least an axially directed part of the carrier member trapped directly between said ring means and said face seal.

6. A fluid face seal assembly as set forth in claim 5, wherein the ring is flanged radially inwardly, the radial flange engagint the outwardly directed step of the carrier member.

7. A fluid face seal assembly as set forth in claim 6 wherein the ring has an axial sleeve extending into the bore of the annular seal, said sleeve and said bore having inter-engaging grooves and ribs acting both to stabilise axial movement of the face seal and to prevent relative rotation between the component parts of said assembly.

8. A fluid face seal assembly as set forth in claim 6 wherein the face seal has an axial sleeve extending towards the inner limb of the annular seal, said sleeve and said inner limb having inter-engaging grooves and ribs acting both to stabilise axial movement of the face seal and to prevent relative rotation between said face seal and said annular seal.

9. A fluid face seal assembly as set forth in claim 1 wherein said means for preventing relative rotation includes interlocking portions of said radially inner axially directed limb and said retainer.

10. A fluid face seal assembly as set forth in claim 1 wherein said spring means directly engages said face seal and said stiff ring-shaped element.

* * * * *

UNITED STATES PATENT AND TRADEMARK OFFICE
CERTIFICATE OF CORRECTION

PATENT NO. : 4,063,741
DATED : December 20, 1977
INVENTOR(S) : WILLIAM KERR

It is certified that error appears in the above—identified patent and that said Letters Patent are hereby corrected as shown below:

Title page, in the heading, the Priority Data should read:

-- Oct. 17, 1974    United Kingdom . . . . 44983/74
                          and
   Aug. 28, 1975    United Kingdom . . . . 35452/75 --

Signed and Sealed this

Fourth Day of July 1978

[SEAL]

Attest:

RUTH C. MASON
Attesting Officer

DONALD W. BANNER
Commissioner of Patents and Trademarks